(12) United States Patent
Suneja et al.

(10) Patent No.: US 11,281,767 B2
(45) Date of Patent: Mar. 22, 2022

(54) SECURE SYSTEM STATE EXTRACTION SOFTWARE EXTENSIBILITY VIA PLUGIN SANDBOXING

(71) Applicant: International Business Machines Corporation, Armonk, NY (US)

(72) Inventors: Sahil Suneja, Yorktown Heights, NY (US); Shripad Nadgowda, White Plains, NY (US); Canturk Isci, Ridgewood, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 220 days.

(21) Appl. No.: 15/934,412

(22) Filed: Mar. 23, 2018

(65) Prior Publication Data

US 2019/0294779 A1    Sep. 26, 2019

(51) Int. Cl.
*G06F 21/53*    (2013.01)
*G06F 9/455*    (2018.01)

(52) U.S. Cl.
CPC .......... *G06F 21/53* (2013.01); *G06F 9/45545* (2013.01); *G06F 9/45558* (2013.01);
(Continued)

(58) Field of Classification Search
CPC .. G06F 21/50–54; G06F 9/44; G06F 9/45545; G06F 9/45558; G06F 2009/45587; G06F 2009/45595
See application file for complete search history.

(56) References Cited

U.S. PATENT DOCUMENTS 9,621,435 B2    4/2017    Vasudevan et al.
9,626,204 B1    4/2017    Banga et al.
(Continued)

OTHER PUBLICATIONS

Hallyn, S. & Morgan, A., Linux Capabilities: making them work, Jul. 2008, Proceedings of the Linux Symposium, p. 3 (Year: 2008).*
(Continued)

*Primary Examiner* — Daniel B Potratz
*Assistant Examiner* — D'Arcy Winston Straub
(74) *Attorney, Agent, or Firm* — Amin, Turocy & Watson, LLP

(57) ABSTRACT

A sandbox component, operatively coupled to a host and a guest container, the sandbox component securely extends systems data collection software with potentially untrusted third-party code. A secure environment is enabled where plugins will run inside a sidecar container that is separate from a guest container. A container consists of an entire runtime environment: an application, plus its dependencies, libraries and other binaries, and configuration files needed to run it, bundled into one package. A sidecar service is not necessarily part of the application but is connected to the guest container and follows the parent application. A sidecar is independent from its primary application in terms of runtime environment and programming language. The sidecar plugin will be given a sparse/limited set of privileges required to simply perform its intended function and the Linux kernel constructs will control data access and transfer. The Plugin is essentially considered sandboxed as it runs in a sidecar and is fenced in by a set of kernel constructs.

20 Claims, 10 Drawing Sheets

(52) U.S. Cl.
    CPC ............. *G06F 2009/45587* (2013.01); *G06F 2009/45595* (2013.01)

(56) References Cited

U.S. PATENT DOCUMENTS

| | | | | |
|---|---|---|---|---|
| 2010/0122343 | A1* | 5/2010 | Ghosh | G06F 21/53 726/23 |
| 2014/0115718 | A1* | 4/2014 | Kellerman | G06F 21/121 726/27 |
| 2014/0281376 | A1* | 9/2014 | Yamada | G06F 9/45533 712/28 |
| 2015/0347200 | A1* | 12/2015 | Fadel | G06F 9/54 719/319 |
| 2015/0356294 | A1* | 12/2015 | Tan | G06F 21/54 726/22 |
| 2016/0065680 | A1* | 3/2016 | Harper | H04L 12/413 709/225 |
| 2016/0342786 | A1* | 11/2016 | Gerebe | G06F 21/52 |
| 2017/0098071 | A1* | 4/2017 | Stopel | G06F 21/554 |
| 2017/0214550 | A1* | 7/2017 | Kumar | H04L 43/10 |
| 2018/0041477 | A1* | 2/2018 | Shaposhnik | G06F 21/53 |
| 2018/0255100 | A1* | 9/2018 | Degioanni | H04L 63/1425 |
| 2018/0314846 | A1* | 11/2018 | Schultz | G06F 9/45558 |

OTHER PUBLICATIONS

Brumley, D. & Song, D., Privtrans: Automatically Partitioning Programs for Privilege Separation, 2004, Proceedings of the 13th USENIX Security Symposium, p. 1-2 (Year: 2004).*
Anonymous, Sidecar-container-based-crawler plugins and box, Jan. 22, 2018 (Year: 2018).*
Anonymous, Safe System State Extraction Extensibility via Plugin Sandboxing, Dec. 19, 2017 (Year: 2017).*
Anonymous, "Safe System State Extraction Extensibility via Plugin Sandboxing," Dec. 19, 2017, 7 pages.
Suneja, "Sidecar-container-based crawler plugin sandbox," Jan. 22, 2018, 5 pages.
Cannon, "Controlling Access to Resources Within the Python Interpreter," 2007, 34 pages.
Madhavapeddy, et al., "Unikernels: Library Operating Systems for the Cloud," ASPLOS'13, Mar. 16-20, 2013, 12 pages.
adsafe.org, "Making JavaScript Safe for Advertising," Retrieved: Jan. 4, 2018, 4 pages.
qubes-os.org, "An Introduction to Qubes OS," Retrieved: Jan. 4, 2018, 5 pages.
Maffeis, et al., "An Operational Semantics for JavaScript," Last Accessed: Jan. 25, 2018, 18 pages.
Kim, et al., "Practical and effective sandboxing for non-root users," 2013 USENIX Annual Technical Conference, 6 pages.
Chari, et al., "BlueBoX: A Policy-driven, Host-Based Intrusion Detection system," Last Accessed: Jan. 25, 2018, 13 pages.
Provos, "Improving Host Security with System Call Policies," Nov. 11, 2002, 15 pages.
Deline, et al., "Enforcing High-Level Protocols in Low-Level Software," PLDI 2001, 11 pages.
firejail.wordpress.com, "Firejail security sandbox," Retrieved: Jan. 4, 2018, 4 pages.
github.com, "Python AST-based static analyzer from OpenStack Security Group," Retrieved: Jan. 4, 2018, 11 pages.
github.com, "vstinner / pysandbox," Retrieved: Jan. 4, 2018, 8 pages.
Evans, et al., "Improving Security Using Extensible Lightweight Static analysis," 2002 IEEE, 10 pages.
Bai, "A Plugin-based, Uniform Client Framework for Data Protection," IP.com Electronic Publication Date: Jun. 5, 2013, 9 pages.
Glazner, et al., "Web Browser Plugin Security," IP.com Electronic Publication Date: Oct. 14, 2016, 6 pages.
Viega, et al., "ITS4: A Static Vulnerability Scanner for C and C++ Code," Last Accessed: Jan. 25, 2018, 15 pages.

Golderg, et al., "A Secure Environment for Untrusted Helper Applications," Last Accessed: Jan. 25, 2018, 15 pages.
Mettler, et al., "Joe-E: A Security-Oriented Subset of Java," Last Accessed: Jan. 25, 2018, 18 pages.
Ko, et al., "Detecting and Countering System Intrusions Using Software Wrappers," Last Accessed: Jan. 25, 2018, 12 pages.
Borate, et al., "Sandboxing in Linux: From Smartphone to Cloud," International Journal of Computer Applications (0975-8887), vol. 148—No. 8, Aug. 2016, 8 pages.
Maass, "A Theory and Tools for Applying Sandboxes Effectively," Mar. 2016, 166 pages.
Acharya, et al., "MAPbox: Using Parameterized Behavior Classes to Confine Untrusted Applications," Proceedings of the 9th USENIX Security Symposium, Denver, Colorado, USA Aug. 14-17, 2000, 18 pages.
Engler, et al., "Checking System Rules Using System-Specific, Programmer-Written Compiler Extensions," Last Accessed: Jan. 25, 2018, 16 pages.
bromium.com, "Micro-Virtualization | Micro Virtual Machine," Retrieved: Jan. 4, 2018, 2 pages.
Yee, et al., "Native Client: A Sandbox for Portable, Untrusted x86 Native Code," 2009 IEEE Symposium on Security and Privacy, 15 pages.
Necula, et al., "Proof-Carrying Code," Last Accessed: Jan. 25, 2018, 14 pages.
Garfinkel, et al., "Ostia: A Delegating Architecture for Secure System Call Interposition," Last Accessed: Jan. 26, 2018, 15 pages.
Baratloo, et al., "Transparent Run-Time Defense Against Stack Smashing Attacks," Last Accessed: Jan. 26, 2018, 12 pages.
plash.beasts.org, "Plash: tools for practical least privilege," Last Accessed: Jan. 26, 2018, 4 pages.
cloud.google.com, "Python Runtime Environment | App Engine standard environment for Python | Google Cloud Platform," Last Accessed: Jan. 26, 2018, 4 pages.
Dan, et al., "A Sandbox Operating System Environment for Controlled Execution of Alien Code," Feb. 20, 1997, 23 pages.
Bernaschi, et al., "REMUS: A Security-Enhanced Operating System," vol. 5., No. 1, 2002, pp. 36-61.
Ayer, "KVMSandbox: Application-Level Sandboxing with x86 Hardware Virtualization and KVM," Last Accessed: Jan. 26, 2018, 16 pages.
Kiriansky, et al., "Secure Execution Via Program Shepherding," Proceedings of the 11th USENIX Security Symposium (Security '02), San Francisco, California, Aug. 2002, 16 pages.
Miller, et al., "Caja Safe active content in sanitized JavaScript," Jun. 7, 2008, 29 pages.
Scott, et al., "Safe Virtual Execution Using Software Dynamic Translation," Last Accessed: Jan. 26, 2018, 4 pages.
Erlingsson, et al., "SASI Enforcement of Security Policies: A Retrospective," Last Accessed: Jan. 26, 2018, 9 pages.
Cappos, et al., "Retaining Sandbox Containment Despite Bugs in Privileged Memory-Safe Code," CCS'10, Oct. 4-10, 2010, Chicago, Illinois, USA, 12 pages.
Wahbe, et al., "Efficient Software-Based Fault Isolation," SIGOPS '93/12/93, 14 pages.
Wallach, et al., "Extensible Security Architectures for Java," 16th Symposium on Operating Systems Principles, Oct. 1997, 26 pages.
Cowan, et al., "StackGuard: Automatic Adaptive Detection and Prevention of Buffer-Overflow Attacks," Proceedings of the 7th USENIX Security Symposium, San Antonio, Texas, Jan. 26-29, 1998, 16 pages.
Larochelle, et al., "Statically Detecting Likely Buffer Overflow Vulnerabilities," Last Accessed: Jan. 26, 2018, 13 pages.
Jain, et al., "User-Level Infrastructure for System Call Interposition: A Platform for Intrusion Detection and Confinement," Last Accessed: Jan. 26, 2018, 16 pages.
Mitchem, et al., "Using Kernel Hypervisors to Secure Applications," 1997 IEEE, 7 pages.
Watson, et al., "Capsicum: practical capabilities for UNIX," Last Accessed: Jan. 26, 2018, 17 pages.

* cited by examiner

SECURE SYSTEM STATE EXTRACTION SOFTWARE EXTENSIBILITY VIA PLUGIN SANDBOXING

TECHNICAL FIELD

The subject disclosure relates generally to a method of running 3$^{rd}$ party untrusted plugins against guest containers on a shared cloud host machine, utilizing the concept of sidecar container sandboxing and manipulating kernel constructs, while protecting client and host.

SUMMARY

The following presents a summary to provide a basic understanding of one or more embodiments of the invention. This summary is not intended to identify key or critical elements, delineate scope of the particular embodiments or scope of the claims. Its sole purpose is to present concepts in a simplified form as a prelude to the more detailed description that is presented later. In one or more embodiments described herein, systems, computer-implemented methods, apparatus and/or computer program products that facilitate the production of a final product using neural networks in a context are described.

This innovation provides for a sandbox component, operatively coupled to a host and a guest container, the sandbox component securely extends systems data collection software with potentially untrusted third-party code. The innovation enables a secure environment where plugins will run inside a sidecar container that is separate from a guest container. A container consists of an entire runtime environment: an application, plus its dependencies, libraries and other binaries, and configuration files needed to run it, bundled into one package. A sidecar service is not necessarily part of the application but is connected to the guest container and follows the parent application. A sidecar is independent from its primary application in terms of runtime environment and programming language. The sidecar plugin will be given a sparse/limited set of privileges required to simply perform its intended function and the Linux kernel constructs will control data access and transfer. The Plugin is essentially considered sandboxed as it runs in a sidecar and is fenced in by a set of kernel constructs.

According to an embodiment, a processor that executes computer executable components stored in the memory, wherein the computer executable components comprise: a guest container system that is separated from the sidecar container running the plugin by the configuration of a set of kernel constructs According to another embodiment, is also comprised of a sandbox component, operatively coupled to a host and the guest container, the sandbox component executes a plugin inside a sidecar container that is separate from the guest container, wherein the plugin is provided with level of access rights and constraints so that the plugin is prevented from conducting unauthorized acts on the host or inside the guest container.

DETAILED DESCRIPTION

Figure 1:
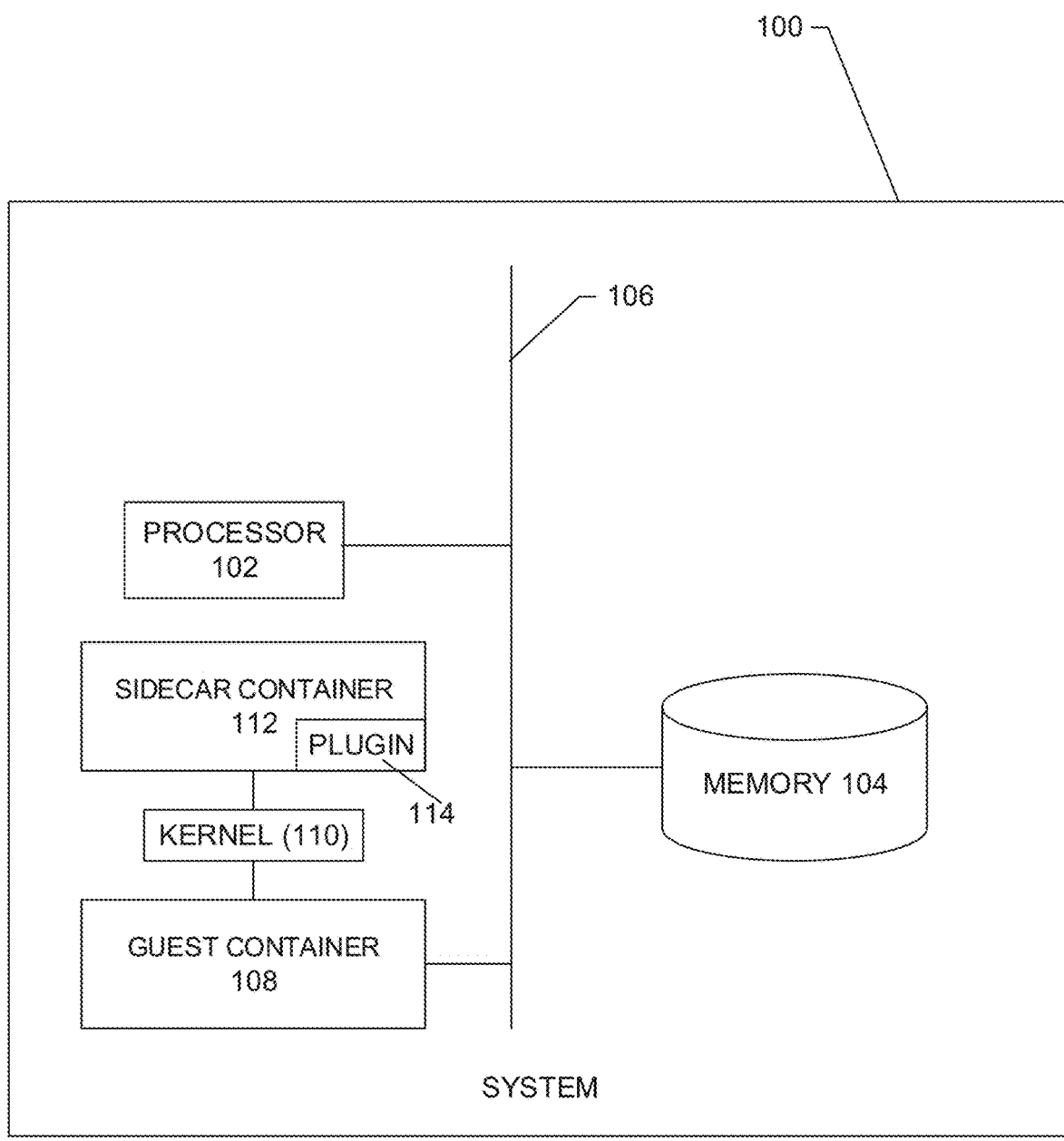
FIG. 1 illustrates a block diagram of an example system implemented that can host a guest container and a sandboxed sidecar container that is segregated from the guest by adjusting the kernel constructs so the Plugin is prevented from conducting unauthorized acts on the host or the guest container.

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

In the internet age, extensibility to software applications is vital and can be achieved in many cases by augmenting the core capabilities of the software application with different plugins, each encapsulating specialized logic for performing a particular action. Running third-party plugins securely in an end-user environment is critical as all inter-related software and hardware content need to be protected from intended or (unintended) plugin software that could hamper the applications and/or the computing environment.

In the context of systems data collection, there are a few tools to address plugin security, from the point of view of plugin-based extensibility. Some tools do incorporate some security emphasis in their design (like Sensu and Collectd), while a few others publish certain security-oriented guidelines for plugin authors to follow, and end users to ensure (like nagios, new relic). But, most tools transfer the security onus onto the target endpoint leaving it vulnerable to negative impact by a 3rd party.

There are preventative techniques that are employed to limit security flaws from software, however each has its own weaknesses. Techniques such as human code reviews can be time consuming and expensive along with its complete dependence on the reviewer. Also, the plugin may employ code obfuscation instead of programming errors that can be missed by the reviewer. Other techniques also have security limitations: code transformation can be limited to specific architectures, system call interposition can have a compromised syscall access policy, language-based sandboxing can be restrictive and the programming language itself may have bugs, OS isolation can have insufficient individual constructs and hardware virtualization can lack secure mechanisms. Other security check methods also have their own shortcomings.

Accommodating extensibility within various user environments such as a client server has become common place in the software world. Consider a shared machine in the cloud (the host) running multiple guest containers (the client), systems state extraction software running on the host, and the software runs in an agentless, non-intrusive manner, without requiring guest modification (e.g., no in-guest installation and execution). This specific software allows custom extensibility by accepting user-provided plugins. The innovation will allow plugin functionality within this environment to execute its function while mitigating risk of infecting client or host and preventing destructive outcomes such as a DoS attack (denial of access), botnets, fork bombs, crashed processes, stolen secrets, etc. There are various Plugin types in the context of hosted systems of a cloud. Some examples of plugins and the system state they encapsulate are: CPU Plugin type with extracted state of Idle, wait, user, utilization rate, Interface Plugin type with Bytes, packets, tx/rx, and "Netflow" Plugin type with an extracted state of netflow data.

Current methods for securing plugins employ techniques such as enforcing client server separation during data collection or tasks such as code analysis, code transformation, system call interposition, language-based sandboxing, OS isolation, and hardware virtualization, each method with shortcomings. This innovation implements a sidecar container sandbox concept to address security. Within a cloud host machine, implement a sidecar container in association with a guest container running on the host, the sidecar being separate from the guest container, wherein third party (untrusted) plugins running in the sidecar container include controlled access to the guest container that is provided using kernel constructs, wherein the sidecar container and kernel constructs create a sandbox that protects both the guest container and host from potential malicious effects from the plugins. Running the plugins inside a container (sidecar; separate from the guest container) can protect the host, assuming container technology is secure, as a sidecar is independent from its primary application in terms of runtime environment and programming language.

The kernel constructs which imitate a configurable filter, controls and regulates all communications between the sidecar container (running the plugin) and the guest container (both running on the host). Example kernel constructs are "Privilege Separation, Namespaces, Capabilities, SecComp and IP tables". The parameters on the kernel constructs can provide additional security as they control the required gatekeeping to essentially quarantine the sidecar but yet allow key Plugin functionality intended to service the application without harm. Each of the kernel constructs can be modified or configured to optimize security without compromising the operational objective of the plugin software.

The Plugin will require access to specific areas in the guest container, the memory, the root directory, and the network. The construct "Privilege Separation" will define the plugin as an unprivileged user inside the sidecar so it's not considered ROOT. The UID (User ID) of the plugin will be set to an unprivileged value, different from the guest UID, to facilitate this security attribute. We only want to sidecar to access the guest with READ ONLY (RO) capability so the disk of the guest container is mounted as RO. Now the sidecar plugin can read data from the disk but not write to it.

The sidecar container should have access to the guest memory. User namespaces need not be shared; a main requirement is that the plugin is run as a non-root user, in a separate user namespace than the host's. Example namespaces are "pid", "net" and "user". Since the sidecar plugin is an unprivileged user, it cannot access which files are actually open. To allow the sidecar to access file names on the guest, certain capabilities are granted to the sidecar. Example capabilities granted to the sidecar are cap_sys_chroot, cap_dac_read_search, and cap_sys_ptrace. These capabilities will allow the following: this will provide a view to the plugins and any imported libraries (e.g., Python packages) that they are inside the guest itself, will allow the sidecar the ability to read files a normal USER ID!=0 could not read, will direct the Linux kernel to conduct a discretionary bypass for the sidecar in the read direction only and allow the sidecar to understand the files, will also allow the plugin to be able to read a guest process' open files or sockets. The cap_sys_ptrace is considered to be a super-power capability so when this capability is given to the sidecar it has the ability to corrupt a process in the guest. The SecComp construct is used to prevent the sidecar from this type of action. The final construct is IPtables, where the configuration of the IP addresses limits the plugin sidecar access to only acceptable connections. The Docker container software platform will be utilized for deployment of these applications.

Thus, this innovation proposes a secure environment where the plugins will run inside a sidecar container, which is separate then the guest container. A container consists of an entire runtime environment: an application, plus all its dependencies, libraries and other binaries, and configuration files needed to run it, bundled into one package. A sidecar service is not necessarily part of the application but is connected to the guest container and follows the parent application. A sidecar is independent from its primary application in terms of runtime environment and programming language. The sidecar plugin will be given the least privileges required to perform its intended function and the Linux kernel constructs will control all data access and transfer. The Plugin is essentially considered sandboxed as it runs in a sidecar and is fenced in by the kernel constructs. The sandbox is run in a separate cgroup for resource isolation. This prevents any fork bombs, and DoS via cpu or memory hogging by plugins.

The sidecar container is additionally given RO access to the guest's cgroups to measure the guest's resource usage.

The plugin sandbox is created by combining kernel constructs: e.g., privilege separation+namespaces+capabilities+seccomp+iptables. This embodiment runs the plugins inside a sidecar container, separate from a guest container, which protects both the host and the guest container, assuming the container technology is secure. Since the plugins essentially extract information residing inside the guest container's memory or disk, the sandboxing process then boils down to providing 'secure' access to the guest container's memory and disk state to the plugin container. This is achieved without modifying the kernel and in conjunction with the Docker container interface platform The first Linux kernel construct in the enclosing of the sandbox is Privilege Separation. This is a technique in which a program is divided into parts which are limited to the specific privileges they require to perform an intended task and is used to mitigate the potential security flaws. The Plugin sidecar is given a UID!=0 (not ROOT) so it is limited in functionality to access and impact certain content in the guest. This also provides the sidecar READ/ONLY access to the root disk, as the disk of the guest is a RO mount. This privilege will allow only intended controlled access to the disk for the sidecar container which is a security measure.

The kernel construct Namespaces limits what an application can see, as namespaces processes have their own view of the system's resources. The Linux kernel provides types of namespaces: e.g., pid, net, mnt, uts, ipc and user. The kernel constructs addressed for this innovation are PID, NET and USER. Each namespace will assist controlling sidecar plugin security against the guest container. User namespaces need not be shared; the main requirement is that the plugin is run as a non-root user, in a separate user namespace than the host's. A process inside a PID namespace only sees processes in the same namespace and cannot kill or trace processes outside that namespace. Network namespaces, as well as other containerization technologies provided by the Linux kernel, are methods for resource isolation and implementing security measures. Processes attached to a Network (NET) namespace see their own network stack, while not interfering with the remainder of the system's network stack. User (USER) namespaces provide both privilege isolation and user identification segregation across multiple sets of processes and this allows the build of a container with seeming administrative rights without actually giving elevated privileges to user processes. This Namespace construct is used to control data sharing with the guest container memory.

The kernel Capabilities construct allows the developer to grant binaries/files specific permissions and provide a concise and efficient way to assign privileged permissions to non-privileged users. The following list shows examples of the capabilities implemented on Linux, and the operations or behaviors that each capability permits:
CAP AUDIT_CONTROL (since Linux 2.6.11)
Enable and disable kernel auditing; change auditing filter rules; retrieve auditing status and filtering rules.
CAP AUDIT_READ (since Linux 3.16)
Allow reading the audit log via a multicast netlink socket.
The capabilities utilized for the innovation are the following:
CAP_SYS_CHROOT This permits calls to chroot.
CAP_DAC_READ_SEARCH This permits the ability to Bypass file read permission checks and directory read and execute permission checks.
CAP_SYS_PTRACE This allows arbitrary processes to be traced using ptrace( )
The use of these capabilities will allow:
 1. The plugins and any imported libraries (like Python packages) to believe that they are inside the guest itself.
 2. The sidecar to access certain file names that an unprivileged user could not.
 3. The Linux kernel to conduct a discretionary access control bypass for the sidecar in the READ direction only.
 4. The Plugin will be able to read (only) files though it does not own the files.

The capabilities are added due to the Namespaces construct not providing the full functionality and complete security we require from the sidecar. These capabilities are provided to the sidecar container so as a non-root user it can still access information inside the memory.

SecComp stands for secure computing mode and is also a construct in the Linux kernel. When enabling Seccomp, the process enters a "secure mode" where only a certain number of available system calls are used. Seccomp is a way to filter syscalls issued by a program and is useful when running untrusted third-party programs. The SecComp construct is used to block the harmful/write-enabling system calls that CAP_SYS_PTRACE enables-ptrace( ) process_vm_writev( ) and optionally perf_event_open( ) The CAP_SYS_PTRACE is considered a super user capability and can terminate or corrupt any process inside the guest. The use of the SecComp negates this by limiting the unprivileged user (sidecar container) to read only access and prevents the sidecar from being able to terminate or corrupt any process running in the guest.

The fifth kernel construct is IPtables, this allows a system administrator to configure tables provided by the Linux kernel firewall for filtering network packets. The kernel contains three tables also called rule lists: INPUT, OUTPUT, and FORWARD. And every packet being sent in or out of the machine is subject to one of these lists. Each packet can be checked against multiple rules that have been configured for security before emerging at the end of the chain. This invention will configure the IPtables to limit the Plugin access to pre-determined IP connections, so it cannot communicate with the outside world and cause potentially harmful security impact.

FIG. 1 illustrates a block diagram of an example, non-limiting system 100 that can facilitate a guest container (108) and a sandbox component (112), operatively coupled to a host and the guest container, the sandbox component executes a plugin inside a sidecar container that is separate from the guest container, wherein the plugin is provided with level of access rights and constraints so that the plugin is prevented from conducting unauthorized acts on the host or inside the guest container. It is important to note that each container shown consists of an entire runtime environment: an application, plus all its dependencies and is NOT a physical device. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System 100 can optionally include a server device, one or more networks and one or more devices (not shown). The system 100 can also include or otherwise be associated with at least one processor 102 that executes computer executable components stored in memory 104. The system 100 can further include a system bus 106 that can couple various components including, but not limited to, a guest container component 108, and a sandbox component 112. The system 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the system 100 and/or any other suitable device that can employ information provided by system 100. It is to be appreciated that system 100, components, models or devices can be equipped with communication components (not shown) that enable communication between the system, components, models, devices, etc. over one or more networks.

In accordance with the system 100, a memory 104 can store computer executable components executable by the processor 102. A sandboxed sidecar component 112 can communicate within prescribed guidelines established by the kernel 110 with the guest container 108 via the Linus kernel constructs (110). The Plugin (software add-on) 114 runs inside the sidecar and is isolated in the context of providing the guest and the host security. The invention will configure the kernel constructs to maximize intended functionality and eliminate potential Plugin threats to the guest and host.

Either of these components can also potentially handle group requests such as a family of three or four using the same methodology. Any suitable predictive model can be employed such as for example: a logical regression model; a Bayesian network; a neural network; hidden Markov model (HMM); or a support vector machine (SVM).

The various components (e.g. inventory optimization component 108, recommendation component 110, and/or other components) of system 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed can be performed by specialized computers for carrying out defined tasks related to various types of neural networks in their particular context. The subject computer processing systems, methods apparatuses and/or computer program products can be employed to solve new problems that arise through advancements in technology, computer networks, the Internet and the like.

Embodiments of devices described herein can employ artificial intelligence (AI) to facilitate automating one or more features described herein. The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 2:
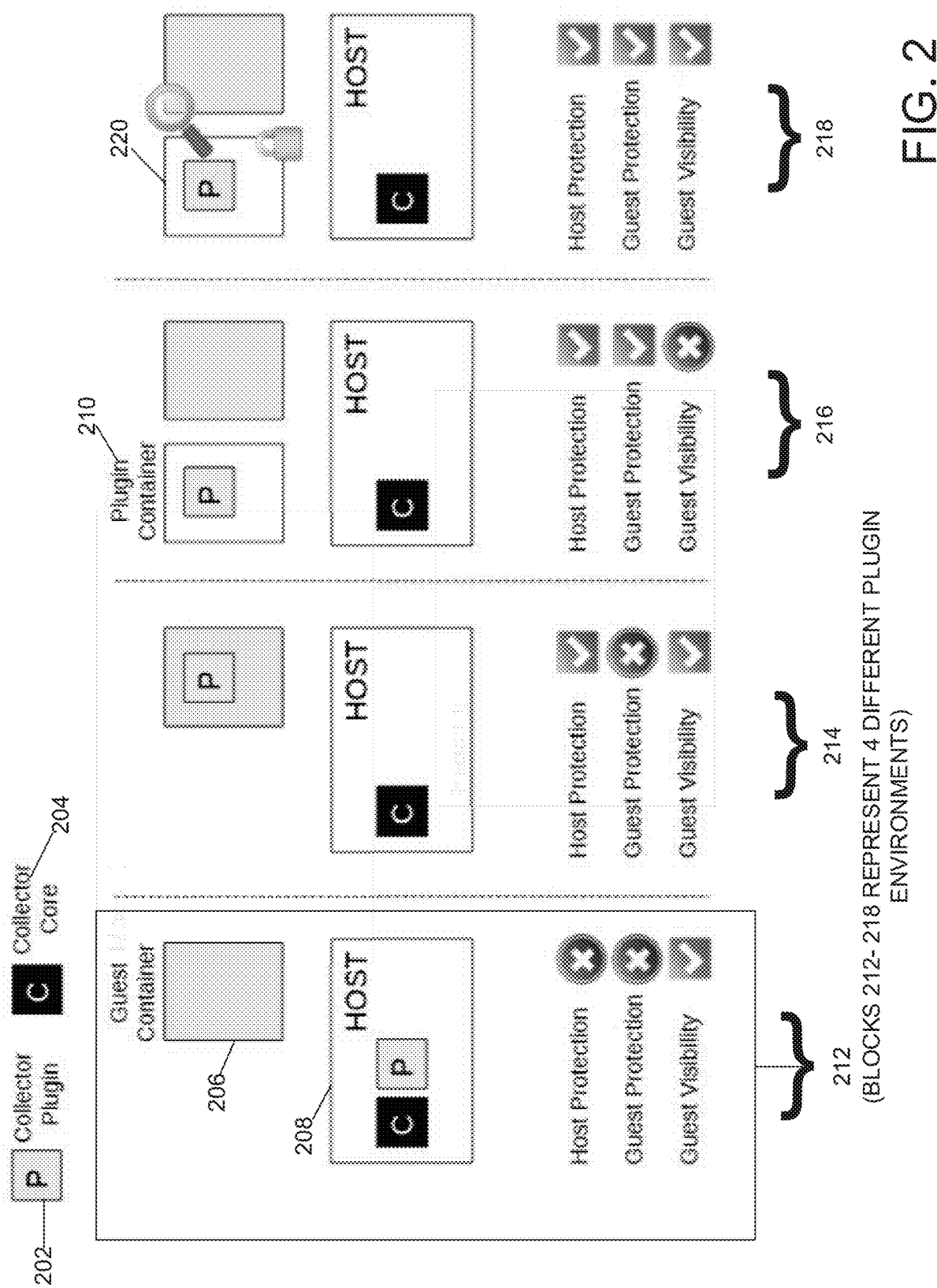
FIG. 2 illustrates different Plugin environments that are reviewed for security.

FIG. 2 illustrates 4 different Plugin environments that are reviewed for security capability. Environment 212 depicts the plugin 202 running on the host 208 with the collector software (system state extraction software) 204 but no sidecar sandboxing feature is implemented. This allows the risk of the plugin infecting the guest and host without adequate protection. Environment 214 depicts the plugin 202 running on the guest container 206 with no sidecar sandbox. Since the plugin is in the guest, the guest is not protected. Environment 216 depicts the plugin 202 running in the sidecar container 210, however this setup does not provide the guest visibility required. The final environment 218 depicts the plugin 202 running on the sidecar container 220 with the access and the constraints in place to communicate with the guest through the kernel constructs that creates the sandbox for the invention. This allows security for the guest (client), the host and guest visibility.

Figure 3:
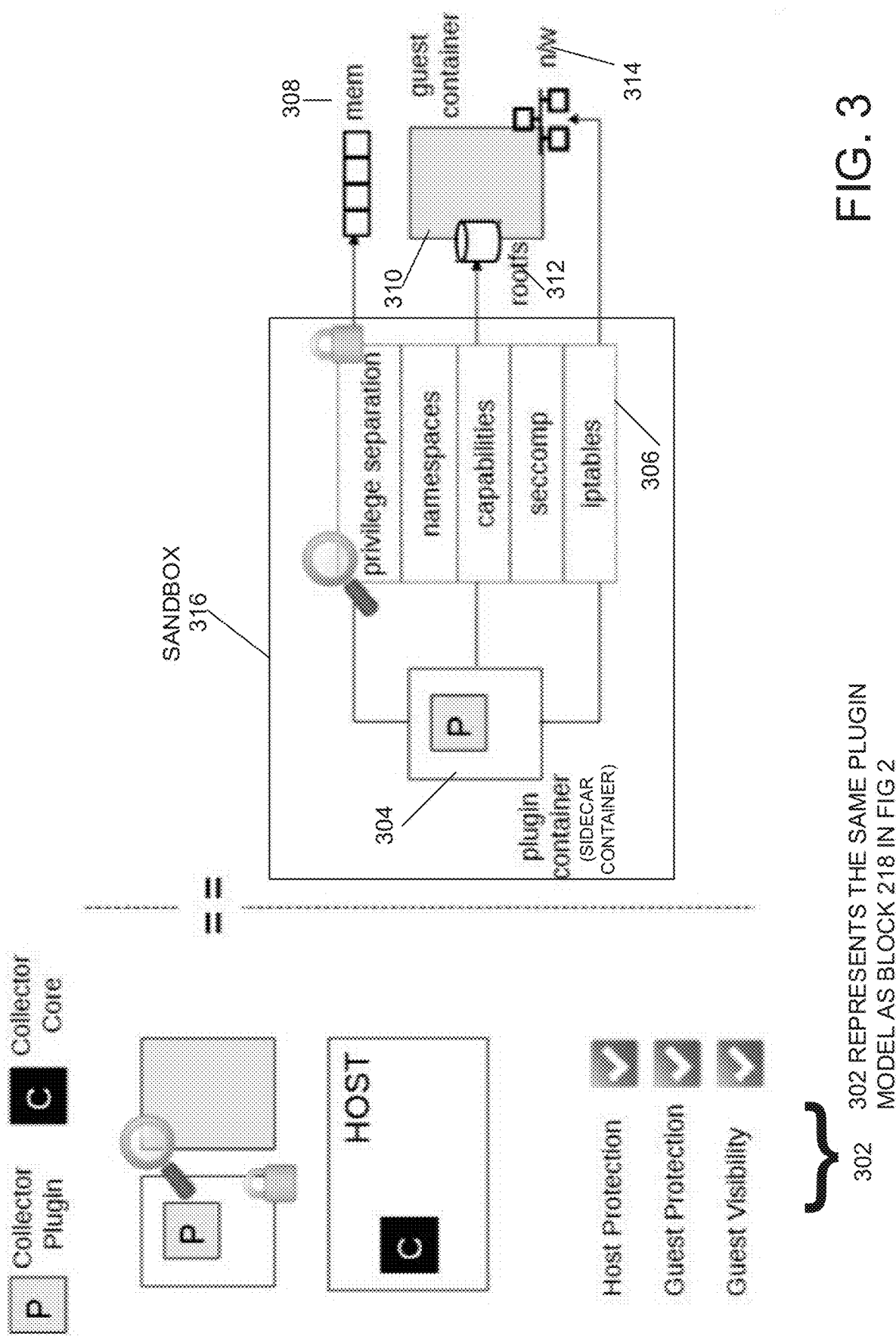
FIG. 3 illustrates kernel constructs used to control the sidecar's access and ability in reference to a guest container.

FIG. 3 illustrates the invention sandbox structure 302 with the sidecar and guest collector software. The sandbox 316 is created by the sidecar container 304 isolated from the guest container 310 by the 5 kernel constructs 306 that controls access and privileges. The constructs 306 are Privileges, Namespaces, Capabilities, SecComp, and Iptables. These 5 constructs are configured to control the gateway traffic between the sidecar and the guest memory (308), the guest root disk (312) and network connectivity (314). This concept of the innovation allows extensive plugin functionality but maintains strong security for host and guest.

Figure 4:
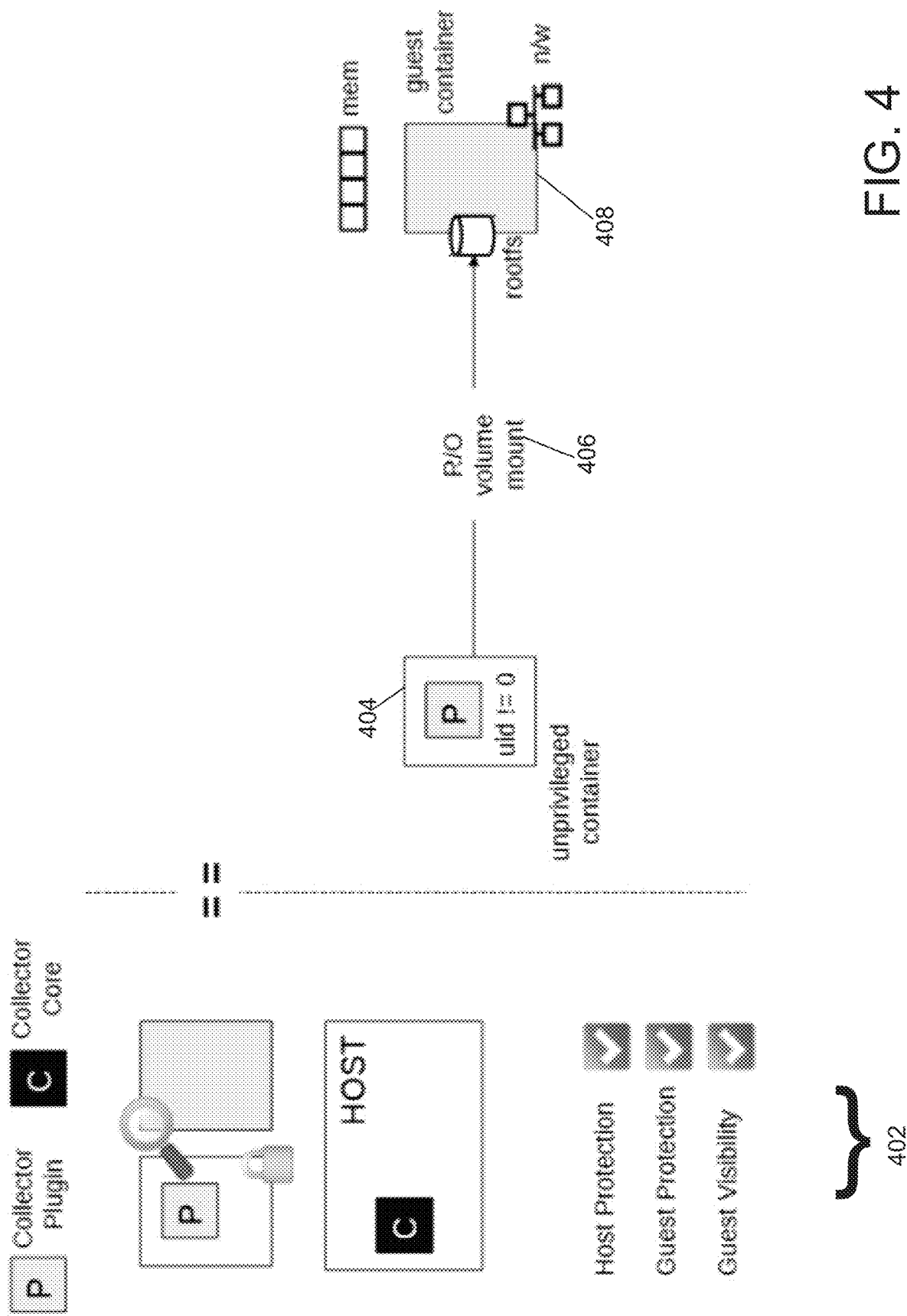
FIG. 4 illustrates the use of the privilege kernel construct to limit the sidecar access to read only (RO) on a disk.

FIG. 4 illustrates another embodiment of the sandbox structure 402. In some embodiments, the first kernel construct which configures the sidecar container running the plugin as a UID!=0 (404), which defines it as not root. The disk is mounted as a RO mount so only RO access is provided to the root disk (406). This depicts the read only access that the kernel construct allows to the guest container 408.

Figure 5:
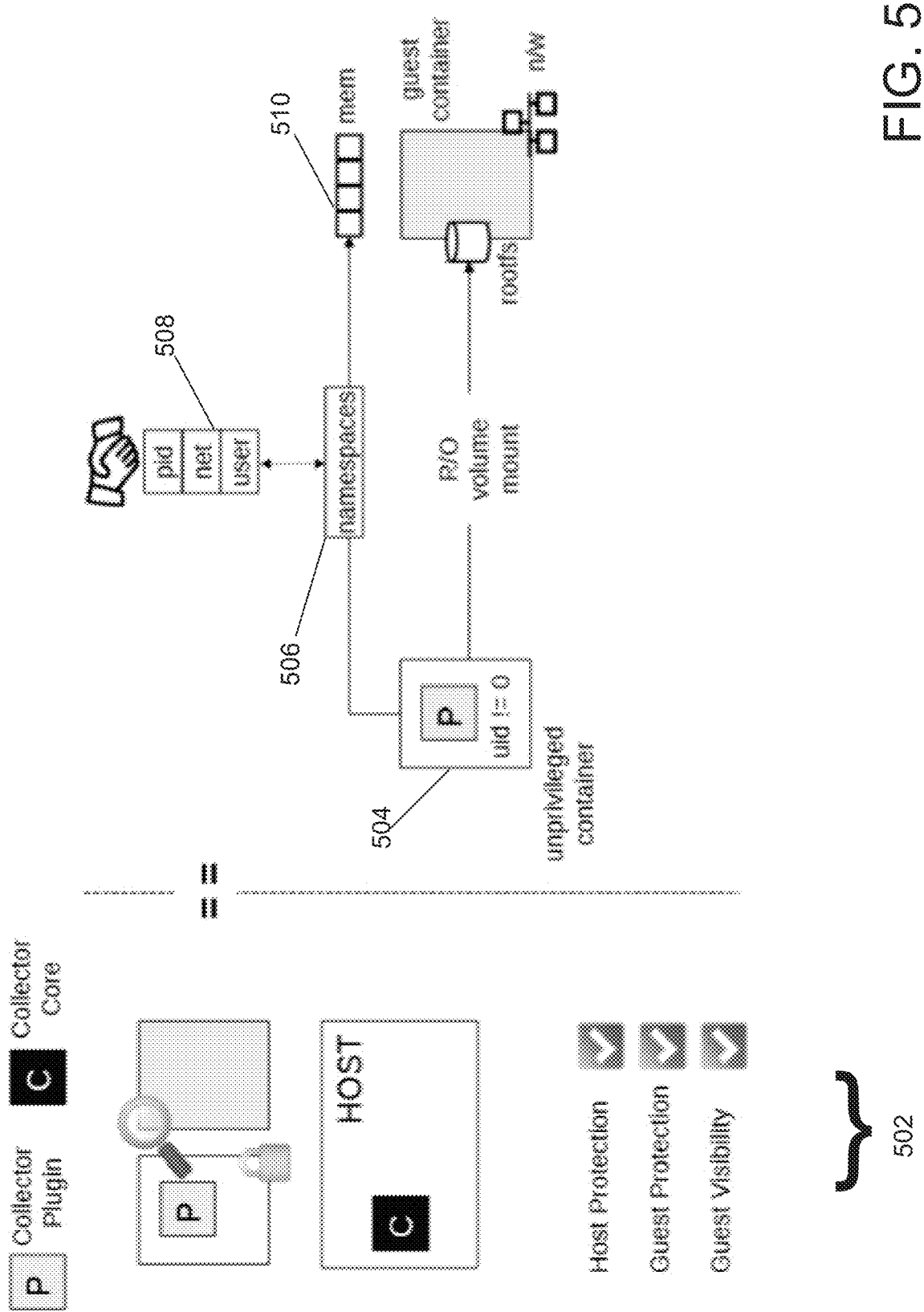
FIG. 5 illustrates the use of a namespace kernel construct to control sidecar access to guest memory.

FIG. 5 illustrates another embodiment of the sandbox structure 502 having a sidecar container 504. In some embodiments, the second kernel construct component is Namespaces (506). This Namespace construct is used to control data sharing with the guest container memory 510. The kernel construct Namespaces limits what an application can see, as namespaces processes have their own view of the system's resources. The Linux kernel provides types of namespaces: pid, net, mnt, uts, ipc and user. The kernel constructs addressed for this innovation are PID and NET (508) and these namespaces will be shared from the guest with the sidecar, the rest being separate. Each namespace will assist controlling sidecar plugin security against the guest container. diagram.

Figure 6:
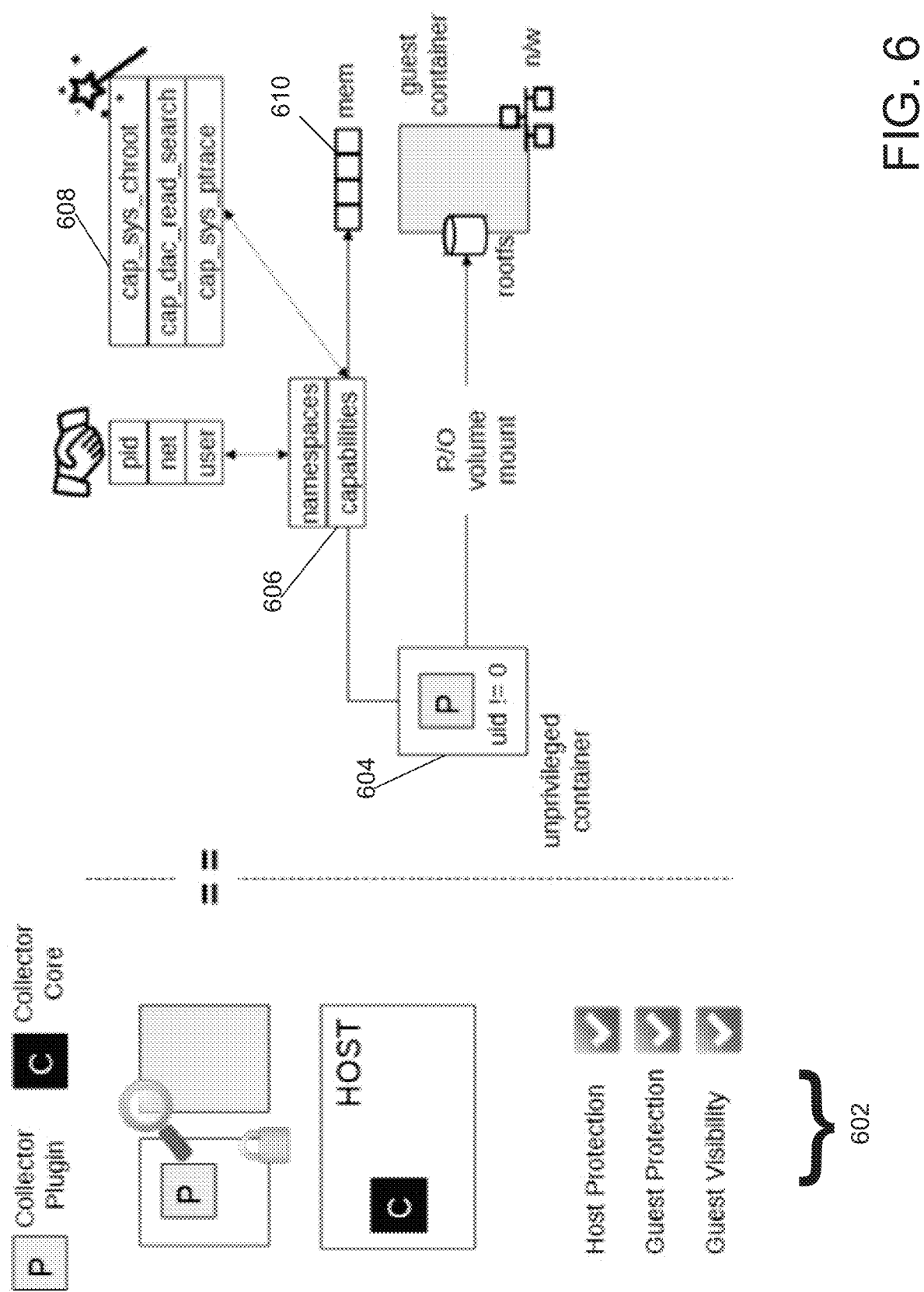
FIG. 6 illustrates the use of kernel construct(s) to provide for a sidecar to read files and access certain library files and content that a typical unprivileged user could not.

FIG. 6 illustrates another embodiment of the sandbox structure 602 having a sidecar container 604. FIG. 6 illustrates kernel Capabilities (606) construct that allow a developer to grant binaries/files specific permissions. The capabilities utilized are: CAP_SYS_CHROOT (this permits calls to chroot) CAP_DAC_READ_SEARCH (this permits the ability to Bypass file read permission checks and directory read and execute permission checks) and CAP_SYS_PTRACE which allows arbitrary processes to be traced using ptrace( ). Use of these capabilities (608) will allow: the plugins and any imported libraries (like Python packages) to believe that they are inside the guest itself, the sidecar to access certain file names that an unprivileged user could not, the Linux kernel to conduct a discretionary access control bypass for the sidecar in the READ direction only, the Plugin to be able to read (only) files though it does not own the files and be able to read a guest process's open files or sockets. These features will control data access the sidecar has to the guest memory 610.

Figure 7:
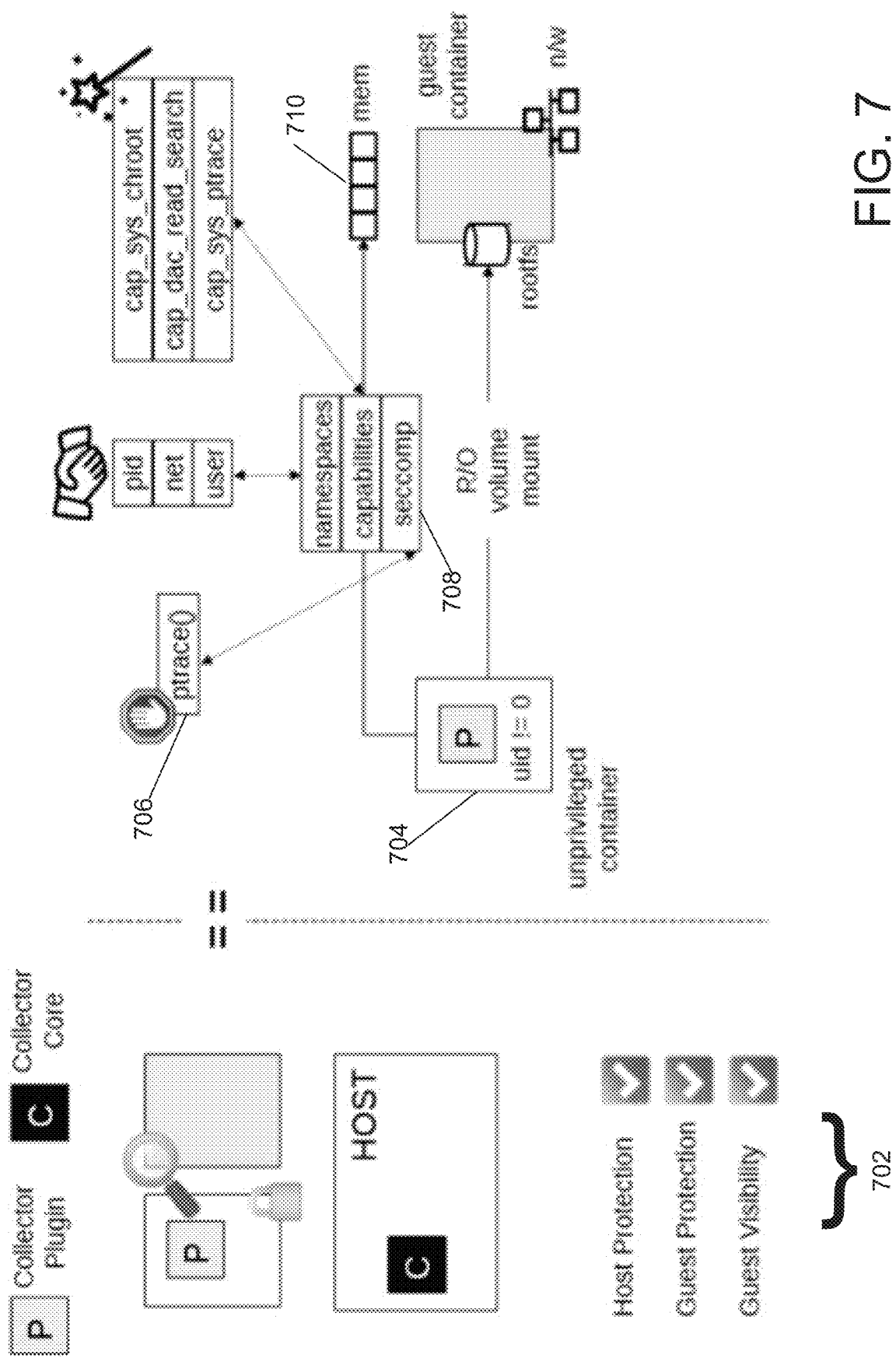
FIG. 7 illustrates use of a SecComp kernel construct to prevent a sidecar from corrupting or terminating guest processes.

FIG. 7 illustrates another embodiment of the sandbox structure 702 and that employs use of the SecComp (708) kernel construct to limit capabilities of the sidecar container 704. The SecComp construct is used to block the harmful/write-enabling system calls that CAP_SYS_PTRACE enables-ptrace( )(706), process_vm_writev( ) and optionally perf_event_open( ). The CAP_SYS_PTRACE is considered a super user capability and can terminate or corrupt any process inside the guest. The use of the SecComp 708 negates this by limiting the unprivileged user (sidecar container) to read only access and prevents the sidecar from being able to terminate or corrupt any process running in the guest. The guest memory 710 can be protected in this manner.

Figure 8:
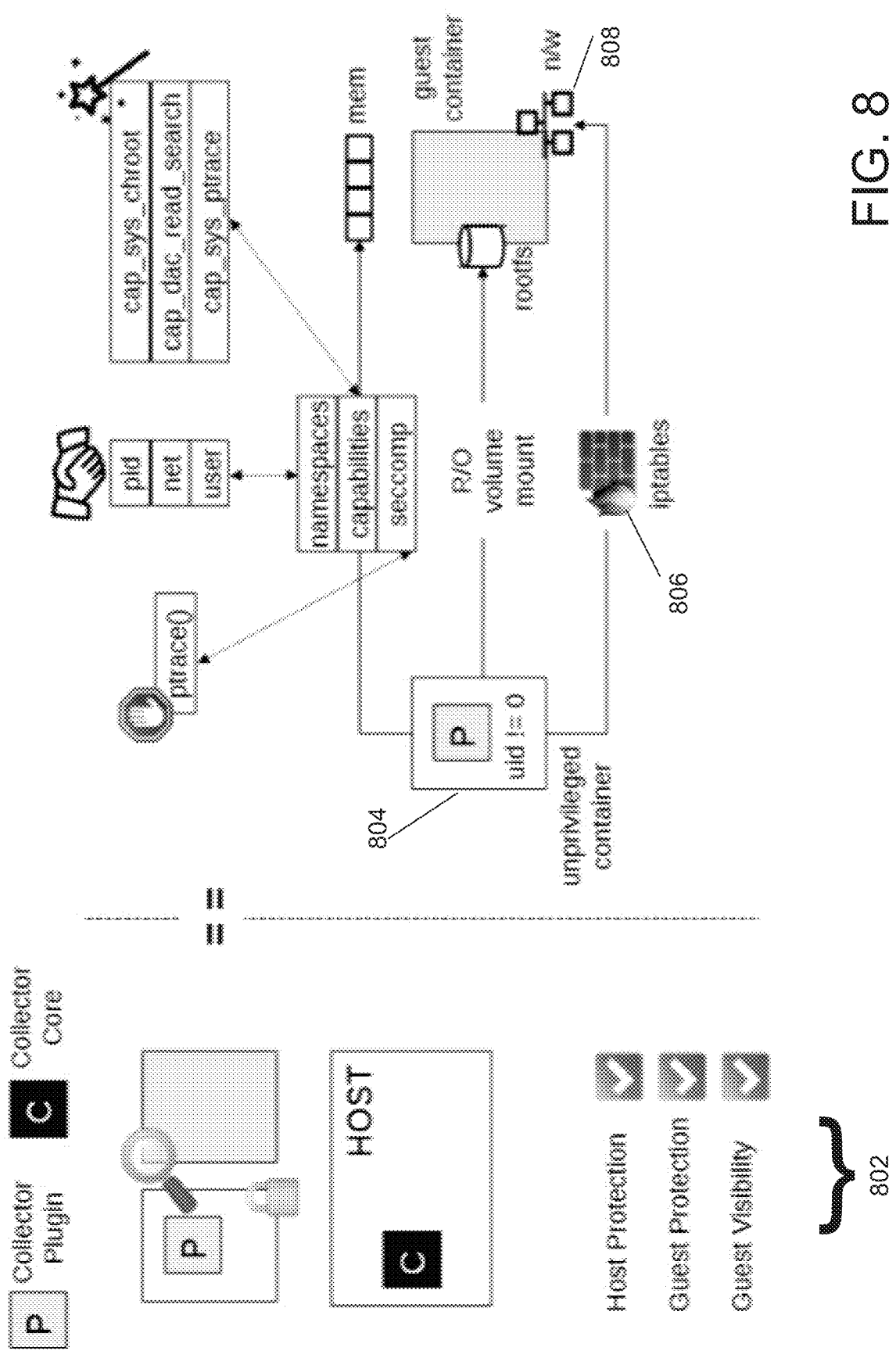
FIG. 8 illustrates use of an Iptables kernel construct to limit a sidecar to controlled connections within a defined network boundary.

FIG. 8 illustrates another embodiment of the sandbox structure 802 having a sidecar container 804. FIG. 8 illustrates the use of the kernel Iptables construct which allows a system administrator to configure tables provided by the Linux kernel firewall (806) for filtering network packets. The kernel contains three tables also called rule lists: INPUT, OUTPUT, and FORWARD. And every packet being sent in or out of the machine is subject to one of these lists. Each packet can be checked against multiple rules that have been configured for security before emerging at the end of the chain. This feature will limit the network connections (808) and data the sidecar can access.

Figure 9:
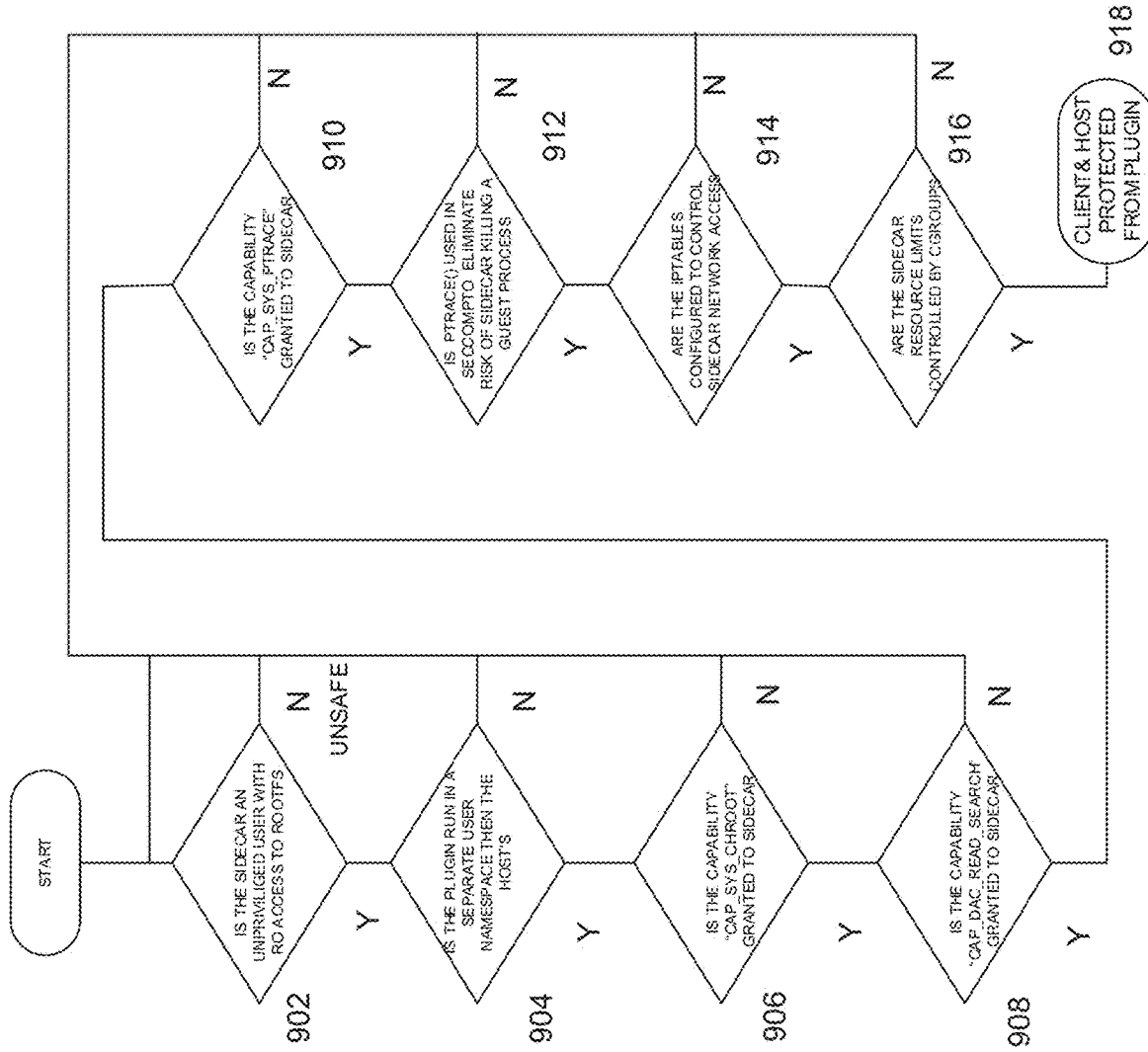
FIG. 9 illustrates a flowchart in accordance with an embodiment.

FIG. 9 illustrates the steps required for this invention to create a secure sandbox plugin environment. Steps 902 through 916 depict each kernel configuration requirement that needs to be met (each of the steps are described in detail in FIG. 4-8 text) to create this security from the plugin. After the completion of these steps, a secure environment for the client and the host is created 918.

Figure 10:
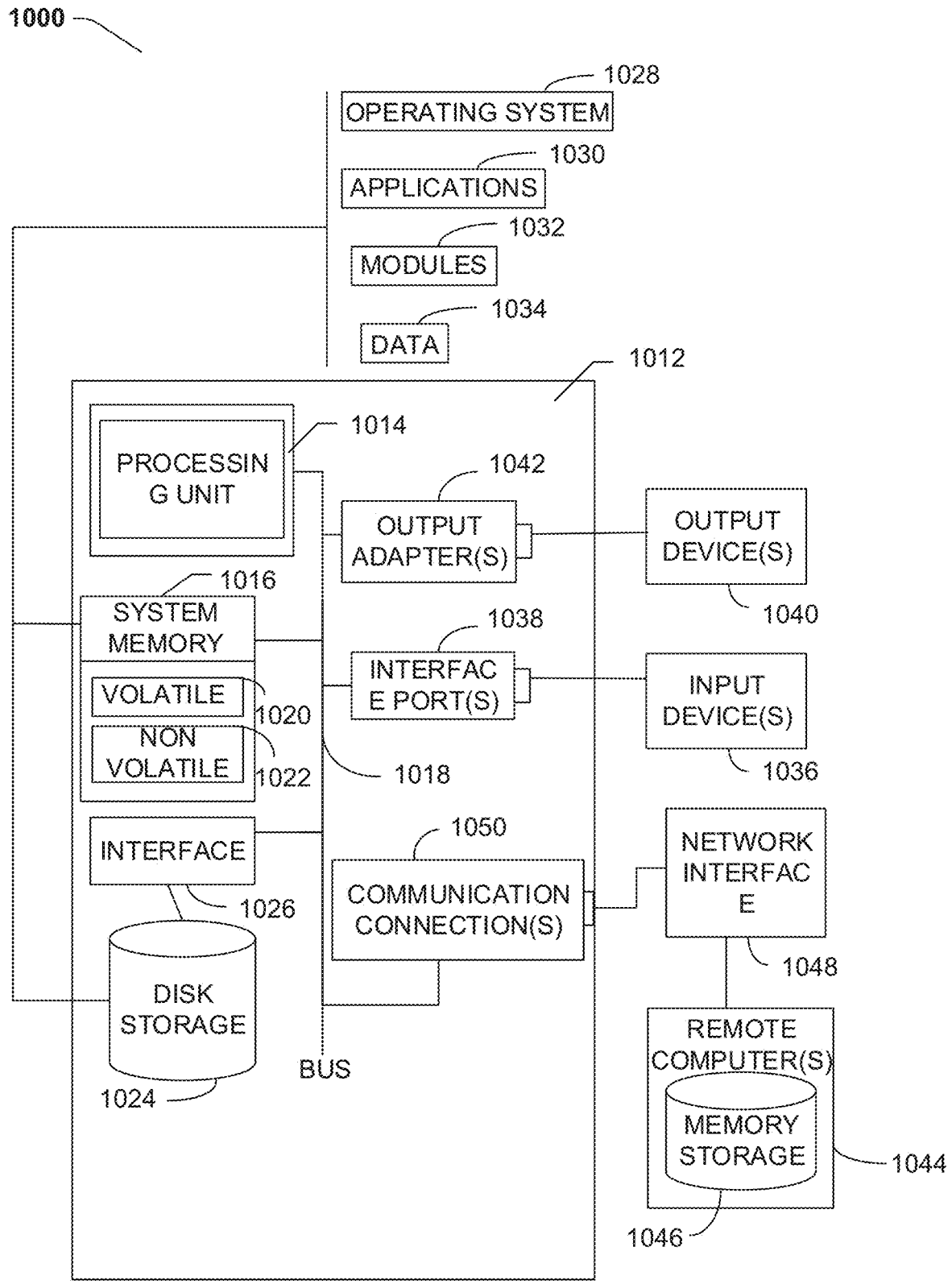
FIG. 10 is a schematic diagram of an example operating environment in accordance with one or more implementations described herein.

To provide context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

A suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/nonvolatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1001. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor that executes computer executable components stored in the memory, wherein the computer executable components comprise:
     a guest container;
     a sandbox component created from at least a sidecar container that follows a parent application and is separate from the guest container and independent from a primary application in terms of runtime environment and programming language, wherein the sandbox component is operatively coupled between a host and the guest container and securely extends system data collection software with potentially untrusted third-party code, wherein the sandbox component comprises:
   a plugin separate from the guest container within the sidecar container; and
   a kernel construct operatively connected between the plugin and the guest container and that provides the plugin with level of access rights and constraints so that the plugin is prevented from conducting unauthorized acts on the host or inside the guest container by:
   enabling access by the sidecar container to the guest container by assigning the sidecar container a user ID and a namespace; and
   granting the sidecar container capabilities that are required by the plugin for full functionality of the plugin; and
   disabling certain aspects of the capabilities granted to the sidecar to eliminate risk of a plugin corrupting or terminating guest processes.

2. The system of claim 1, wherein the sandbox component comprises the following kernel constructs: privilege separation; namespaces; capabilities; seccomp; and iptables.

3. The system of claim 1, wherein the sandbox component provides the plugin with secure access to a memory of the guest container and a disk state of the guest container.

4. The system of claim 3, wherein the plugin access to a state of the guest container is read-only to mitigate side effects and protect the guest container.

5. The system of claim 1, wherein the system data collection software comprises system state extraction software.

6. The system of claim 1, wherein the sandbox component determines access rights and constraints in connection with the plugin without modifying the kernel construct.

7. The system of claim 1, wherein execution of the plugin in the sidecar container provides host security, guest security and guest visibility.

8. The system of claim 1, wherein the plugin is for system state extraction software.

9. The system of claim 1, wherein the sandbox component adjusts access rights and constraints in connection with the plugin without modifying the kernel construct.

10. The system of claim 1, wherein the plugin is granted a minimal set of privileges to perform a defined purpose.

11. The system of claim 1, wherein the sandbox component performs an evaluation to determine whether the guest container and the host are protected from the plugin, wherein the evaluation comprises:
  a determination of whether there is a capability to bypass file read permission checks and directory read and to execute permission checks;
  a determination of whether a defined process is able to traced using ptrace( ) function; and
  a determination of whether a defined secure computing mode is employed in which only a defined number of available system calls are employed.

12. The system of claim 1, wherein enabling access by the sidecar container to the guest container by assigning the sidecar container a user ID and a namespace comprises:
  defining, by the privilege separation kernel construct, the sidecar container as an unprivileged user having read-only access to a root disk within the guest container; and
  limiting, by the namespaces kernel construct, access to a guest container memory by the sidecar container to data allowed by a namespace of the sidecar container, wherein the namespace of the sidecar container is different than a namespace of the host.

13. The system of claim 1, wherein granting the sidecar container capabilities that are required by the plugin for full functionality of the plugin comprises
  granting, by the capabilities kernel construct, CAP_SYS_CHROOT, CAP_DAC_READ_SEARCH, and CAP_SYS_PTRACE to the sidecar container.

14. The system of claim 1, wherein disabling certain aspects of the capabilities granted to the sidecar to eliminate the risk of a plugin corrupting or terminating guest processes comprises
  blocking, by the seccomp kernel construct, write-enabling system calls enabled by CAP_SYS_PTRACE; and
  configuring, by the iptables kernel construct, iptables to limit sidecar container access to pre-determined IP connections.

15. A computer-implemented method, comprising employing a processor and memory to execute computer executable components to perform acts comprising:
  accessing a guest container; and
  employing a sandbox component created from at least a sidecar container, comprising a plugin separate from the guest container and a kernel construct, and that follows a parent application and is separate from the guest container and is independent from a primary application in terms of runtime environment and programming language, wherein the kernel construct is operatively connected between the plugin and the guest container, and wherein the sandbox component is operatively coupled between a host and the guest container, and the sidecar container executes the plugin, the plugin is provided with level of access rights and constraints by the kernel construct so that the plugin is prevented from conducting unauthorized actions on the host or inside the guest container by:
  enabling access by the sidecar container to the guest container by assigning the sidecar container a user ID and a namespace; and
  granting the sidecar container capabilities that are required by the plugin for full functionality of the plugin; and
  disabling certain aspects of the capabilities granted to the sidecar to eliminate risk of a plugin corrupting or terminating guest processes.

16. The method of claim 15, wherein executing the plugin inside the sidecar container protects the host and the guest container.

17. The method of claim 15, wherein the sandbox component provides the plugin with secure access to a memory and a disk state of the guest container.

18. The method of claim 17, wherein the plugin's access to the guest container's state is read-only to mitigate side effects and protect the guest container.

19. A computer program product comprising a non-transitory computer readable storage medium having program instructions embodied therewith, the program instructions executable by processor to cause the processor to:
  access a guest container; and
  employ a sandbox component created from at least a sidecar container comprising a plugin separate from the guest container and a kernel construct, and that follows a parent application and is separate from the guest container and is independent from a primary application in terms of runtime environment and programming language, wherein the sandbox component is operatively coupled between a host and the guest container, and the sidecar container executes the plugin, wherein the plugin is provided with level of access rights and constraints by the kernel construct so that the plugin is prevented from conducting unauthorized acts on the host or inside the guest container by:
  enabling access by the sidecar container to the guest container by assigning the sidecar container a user ID and a namespace; and
  granting the sidecar container capabilities that are required by the plugin for full functionality of the plugin; and
  disabling certain aspects of the capabilities granted to the sidecar to eliminate risk of a plugin corrupting or terminating guest processes.

20. The computer program product of claim 19, further comprising program instructions executable by processor to cause the processor to:
  provide the plugin with secure access to a memory and a disk state of the guest container, wherein the plugin is for system state extraction software;
  balance access rights and constraints in connection with the plugin without modifying the kernel construct, wherein executing the plugin in the sidecar container provides host security, guest security and guest visibility;
  restricting the plugin access to state of the guest container as read-only to mitigate side effects and protect the guest container; and
  grant the plugin a minimal set of privileges to perform a defined purpose.

* * * * *